United States Patent
Samadani

(10) Patent No.: US 6,331,899 B1
(45) Date of Patent: Dec. 18, 2001

(54) METHOD AND APPARATUS FOR AUTOMATICALLY GENERATING SINGLE-CHANNEL CRITICAL COLOR TRANSFORMATIONS

(75) Inventor: Ramin Samadani, Menlo Park, CA (US)

(73) Assignee: Electronics for Imaging, Inc., Foster City, CA (US)

( * ) Notice: Subject to any disclaimer, the term of this patent is extended or adjusted under 35 U.S.C. 154(b) by 0 days.

(21) Appl. No.: 09/172,377

(22) Filed: Oct. 14, 1998

(51) Int. Cl.[7] ......................................... G02B 7/00
(52) U.S. Cl. ..................... 358/1.9; 358/518; 358/523; 358/524
(58) Field of Search ...................... 358/504, 515, 358/518, 519, 520, 522, 525, 538, 448, 452, 453, 447, 523, 524, 1.9; 382/254; 345/154, 153; 348/652, 653, 659

(56) References Cited

U.S. PATENT DOCUMENTS

| | | | |
|---|---|---|---|
| 4,496,968 | * | 1/1985 | Pugsley ................... 358/531 |
| 5,208,911 | * | 5/1993 | Newman et al. ............ 395/162 |
| 5,412,491 | * | 5/1995 | Bachar ................... 358/522 |
| 5,420,979 | * | 5/1995 | Madden et al. ........... 395/162 |
| 5,432,906 | * | 7/1995 | Newman et al. ............ 395/162 |
| 5,552,904 | * | 9/1996 | Ryoo et al. ............... 358/518 |
| 5,583,666 | * | 12/1996 | Ellson et al. ............. 358/518 |
| 5,739,928 | * | 4/1998 | Scott .................... 358/520 |

FOREIGN PATENT DOCUMENTS

| | | | | |
|---|---|---|---|---|
| 0703702A2 | * | 3/1996 | (EP) | ................ H04N/1/60 |
| 0724356A2 | * | 7/1996 | (EP) | ................ H04N/1/405 |
| 0741491A2 | * | 11/1996 | (EP) | ................ H04N/1/60 |
| 851 669A2 | | 7/1998 | (EP) | ................ H04N/1/60 |
| 851 669A3 | | 9/1999 | (EP) | ................ H04N/1/60 |

OTHER PUBLICATIONS

Automatically Generated Single Channel Critical Color Transformation, Samandani, May 28, 1998, Electronics for Imaging.*

* cited by examiner

Primary Examiner—Kimberly A. Williams
(74) Attorney, Agent, or Firm—Michael A. Glenn

(57) ABSTRACT

The invention described herein uses minimization techniques to find a good single-channel transformation that preserves the accuracy of critical colors. The invention takes as inputs a set of critical colors and from these colors determines a set of constraints on the output device and simulated device colorants that is used for the minimization. The constraints are selected to allow the minimization step to determine a consistent single-channel transformation. Then, the color characteristics of a simulated and an output printer are used to find a transformation that minimizes color distance, given the constraints. The invention takes into account certain critical colors during the generation of the single-channel transformation. The invention consists first selecting a set of colorant values in the simulated device color space that are critical to render accurately. The requirements of the critical colors are that they lie on a set of curves in space with the following properties: each curve is smooth and non-intersecting; each curve has at least one coordinate that goes from no ink to full ink; and the set of all curves has the property that for each colorant $c_s$, $m_s$, $y_s$, and $k_s$, there is a curve that has no ink at one endpoint and full ink at the other endpoint. Once the selection of the set of critical colors is made, the functions $f_c$, $f_m$, $f_y$, and $f_k$ are calculated by finding the output colorant values that minimize a colorimetric distance (i.e. CIELAB $\Delta E$) between the input simulated colorant values and the output colorant values.

28 Claims, 6 Drawing Sheets

METHOD AND APPARATUS FOR AUTOMATICALLY GENERATING SINGLE-CHANNEL CRITICAL COLOR TRANSFORMATIONS

BACKGROUND OF THE INVENTION

TECHNICAL FIELD

The invention relates to color printing. More particularly, the invention relates to the automatic generation of single-channel color transformations from one printing device to another that allow output from one printer to closely resemble, or simulate, the output from another printer.

DESCRIPTION OF THE PRIOR ART

In most cases, the primary colorants of a simulated printer differ from the primary colorants of an output printer in both hue and density. The most general approach to simulating a printer using a color transformation from one printing device to another, i.e. the approach that is thought to provide the best color fidelity, involves the transformation $$c_o = f_c(c_s, m_s, y_s, k_s),$$
$$m_o = f_m(c_s, m_s, y_s, k_s),$$
$$y_o = f_y(c_s, m_s, y_s, k_s),$$
$$k_o = f_k(c_s, m_s, y_s, k_s), \quad (1)$$

where $c_o$ represents cyan of the output printer for cyan; $c_s$, $m_s$, $y_s$, and $k_s$ represent the colorants of the simulated printer; and $f_c$ represents a function that generates the output printer cyan colorant from the input colorants of the simulated printer.

A similar notation is used for the other colorants.

This transformation has $c_s$, $m_s$, $y_s$, and $k_s$ values as inputs from an image separated for the simulated device (e.g. DIC inks) and performs the transformations $f_c$, $f_m$, $f_y$, and $f_k$, respectively, to output device colorant values for each of the output $c_o$, $m_o$, $y_o$, and $k_o$ values.

A shorthand description of the foregoing transformation is $$v_o = f(v_s), \quad (2)$$

where $v_o$ is the four-dimensional vector with components $c_o$, $m_o$, $y_o$ and $k_o$; and $v_s$ is the four-dimensional vector with components $c_s$, $m_s$, $y_s$, and $k_s$.

The function f represents the vector function with component functions $f_c$, $f_m$, $f_y$, and $f_k$.

For purposes of the foregoing, it is assumed that the transformation $t_s$ from colorant $v_s$ to device-independent coordinates $T_s$ (e.g. CIELAB D50 two-degree observer) for the simulated device is available and is given by $$T_s = t_s(v_s). \quad (3)$$

The transformation $t_o$ from output device colorant $v_o$ to device-independent coordinates $T_o$ is governed by $$T_o = t_o(v_o). \quad (4)$$

If the function f of Equation 2 above is used for the device simulation, the following tristimulus values are obtained on the output device $$\hat{T}_s = t_o(f(v_s)). \quad (5)$$

Minimizing over possible functions f, $$\hat{f} = \arg f; \min d(T_s, \hat{T}_s). \quad (6)$$

an optimal solution $\hat{f}$ is obtained. In Equation 6, d is a distance function, such as CIELAB $\Delta E$. In the ideal situation, where $T_s = \hat{T}_s$ for all colors, $$t_s(v_s) = t_o(f(v_s)). \quad (7)$$

In this case, the optimal solution is $$\hat{f}(v_s) = t_o^\dagger(t_s(v_s)). \quad (8)$$

This equation reflects in an abstract manner the commonly used approach to simulation that first transforms from the colorant of the simulated printer to device independent coordinates, and that then transforms from device independent coordinates to the output printer colorants. The function $$t_o^\dagger$$

represents the conversion from device independent coordinates to the output colorant, and (in a loose sense) inverts the function $t_o$, even though the function $t_o$ is not invertible in the strict, mathematical sense (because it is a continuous mapping from four input dimensions to three output dimensions).

An additional complication is the mismatch of gamuts between the simulated device and the output device. Further details of gamut mapping are found in H. Kang, *Color Technology For Electronic Imaging Systems*, SPIE press, Bellingham, Wash. (1997).

Even though the approach of Equation 2 above gives the most accurate color fidelity, the class of single-channel color transformations given by $$c_o = f_c(c_s)$$
$$m_o = f_m(m_s)$$
$$y_o = f_y(y_s)$$
$$k_o = f_k(k_s) \quad (9)$$

is also very useful.

Given the limitations of the single-channel transformations of Equation 9 above, it is impossible to simulate devices without errors unless all the single colorant hues and the color mixing properties are the same on both the output and the simulated device. For example, if the hue of the magenta colorant of the simulated device differs from the hue of the magenta colorant of the output device, then the single-channel transformation is not able to match the magenta colors precisely.

Nevertheless, in practice, a single-channel transformation often performs well enough in terms of color fidelity and, in addition, offers several advantages. First, a practical implementation of this approach involves a lookup table having only 256 elements for the cyan transformation, and involves similar transformations for the other colorants. These lookup tables are simple, small and fast, both in hardware and in software implementations.

There are, in addition, potential image quality advantages to the single-channel transformations. For example, it is often desired to map the yellow colorant of the simulated device to the yellow colorant of the output device. Even though this mapping may not be as accurate colorimetrically, it can be a subjectively preferred mapping because it minimizes printing engine artifacts that are seen when yellow and magenta toners are mixed on electrophotographic printers; or it minimizes the visibility of halftone dots on inkjet printers.

For the black channel of the simulated device, it is often also preferred to map only to the black channel of the output device. This approach has the advantage of minimizing sensitivity to shifts in gray balance, as well as advantages in situations where the cost of black only printing is lower than mixed colorant printing due to accounting, e.g. the number of black only prints counted vs . . . the number of color prints counted.

One standard practice that is used to generate single-channel transformations involves measuring single ink densities on the simulated device and, from this, generating targets that consist of $(x, d_s)$ pairs of input ink percent, x, and densities, $d_s$. This target, $(x, d_s)$, is then used on the output device, together with measurements of single toner density response on the output device of $(x, d_o)$ pairs that describe the current behavior of the output device. These two quantities are combined to generate lookup tables for each of the four color channels that compensate for the density differences.

This approach has certain disadvantages, among which is a metamerism problem in that a densitometer may give the same readings even though the colors are different when observed by a viewer and, conversely, the densitometer may give different readings even though the colors are the same when observed by a viewer. This metamerism problem is due to the differences in the spectral response of the densitometer and the spectral response of the average human eye, and the differences in the spectral properties of the inks and the toners. Another disadvantage of this approach is that it does not accurately simulate critical colors, such as flesh tones, that might be more important than the single ink colors.

A second common practice is to start from a given $(x, d_s)$ target and tune the target by iterative printing of pages that consist of images and patches separated to the simulated device, thereby improving the target by trial and error. This approach is time consuming, requires experienced operators, and can be sensitive to the images chosen for the iterations. In other words, one might overlook problems in the targets if certain colorant values are not contained in the images used during the iterations.

A third approach that is used to generate single-channel transformations involves measuring colorimetric data for single inks for the simulated device and matching these measurements to measurements for the output device. This is a very simple approach that is easy to implement but that, in practice, does not provide good simulations because the ways colors mix on the two different devices may differ. Thus, even though the single inks have a close colorimetric match, other colors that are composed of inputs with mixed inks do not have an accurate colorimetric rendition as a result of this simulation. Also, such simulation does not take into account the fact that certain colors, i.e. critical colors, may be more important than other colors with regard to color fidelity in the simulation.

It would be advantageous to provide a simple approach for generating critical color transformations.

SUMMARY OF THE INVENTION

The invention described herein uses minimization techniques to find a good single-channel transformation that preserves the accuracy of critical colors. The invention takes as inputs a set of critical colors and from these colors determines a set of constraints on the output device and simulated device colorants that is used for the minimization. The constraints are selected to allow the minimization step to determine a consistent single-channel transformation. Then, the color characteristics of a simulated and an output printer are used to find a transformation that minimizes color distance, given the constraints. The invention takes into account certain critical colors during the generation of the single-channel transformation. For example, the invention can be used to simulate the Japanese Dai-Nippon Ink standard (simulated printer) on a digital electrophotographic printer (output printer) with good accuracy in flesh tones.

The invention provides a method that consists of first selecting a set of colorant values in the simulated device color space that are critical to render accurately. A requirement of the critical colors is that they lie on a set of curves in the simulated device colorant space. Define each curve in the set to be a smooth, parametric curve given by:

$$s_i(t)=(c_i(t), m_i(t), y_i(t), k_i(t)) \quad (10)$$

where the curve $s_i(t)$ is a vector function of parameter t with individual components $c_i$, $m_i$, $y_i$ and $k_i$, each a scalar function of parameter t in the range [0,1]. The set of curves, S, consists of N curves $s_i$ where the index i=1, . . . , N.

A requirement of the set of curves is that, for each colorant of the simulated device, there is a curve in S that has the corresponding component function be a bijection (one-to-one, onto mapping) to [0,1].

An example that meets the conditions given above for S is the set of curves with the following properties:

1. Each curve is smooth and non-intersecting.
2. Each curve has at least one component that increases from no ink to full ink.
3. The set of all of the curves has the property that for each colorant $c_s$, $m_s$, $y_s$ and $k_s$ there is a curve where that component increases from one endpoint, with no ink, to the other endpoint, with full ink.

Recall that the invention applies to the class of single-channel color transformations given by $$c_o=f_c(c_s)$$

$$m_o=f_m(m_s)$$

$$y_o=f_y(y_s)$$

and $$k_o=f_k(k_s). \quad (11)$$

Once the selection of the set of critical colors is made, the functions $f_c$, $f_m$, $f_y$, and $f_k$ of Equation 11 are calculated by finding the output colorant values that minimize a colorimetric distance (i.e. CIELAB $\Delta E$) between the input simulated colorant values and the output colorant values. It is important that the search space is constrained to an appropriate set of output colorant values before this minimization takes places so that the appropriate functions may be generated. These constraints are built into the minimization process and differ depending on the goals of the user.

DETAILED DESCRIPTION OF THE INVENTION

The invention described herein uses minimization techniques to find a good single-channel transformation that preserves the accuracy of critical colors. The invention takes as inputs a set of critical colors and from these colors determines a set of constraints for the minimization. The constraints are selected to allow the minimization step to determine a consistent single-channel transformation. Then, the color characteristics of a simulated and an output printer are used to find a transformation that minimizes color distance, given the constraints. The invention takes into account certain critical colors during the generation of the single-channel transformation. For example, the invention can be used to simulate the Japanese Dai-Nippon Ink standard (simulated printer) on a digital electrophotographic printer (output printer) with good accuracy in flesh tones.

Figure 1:
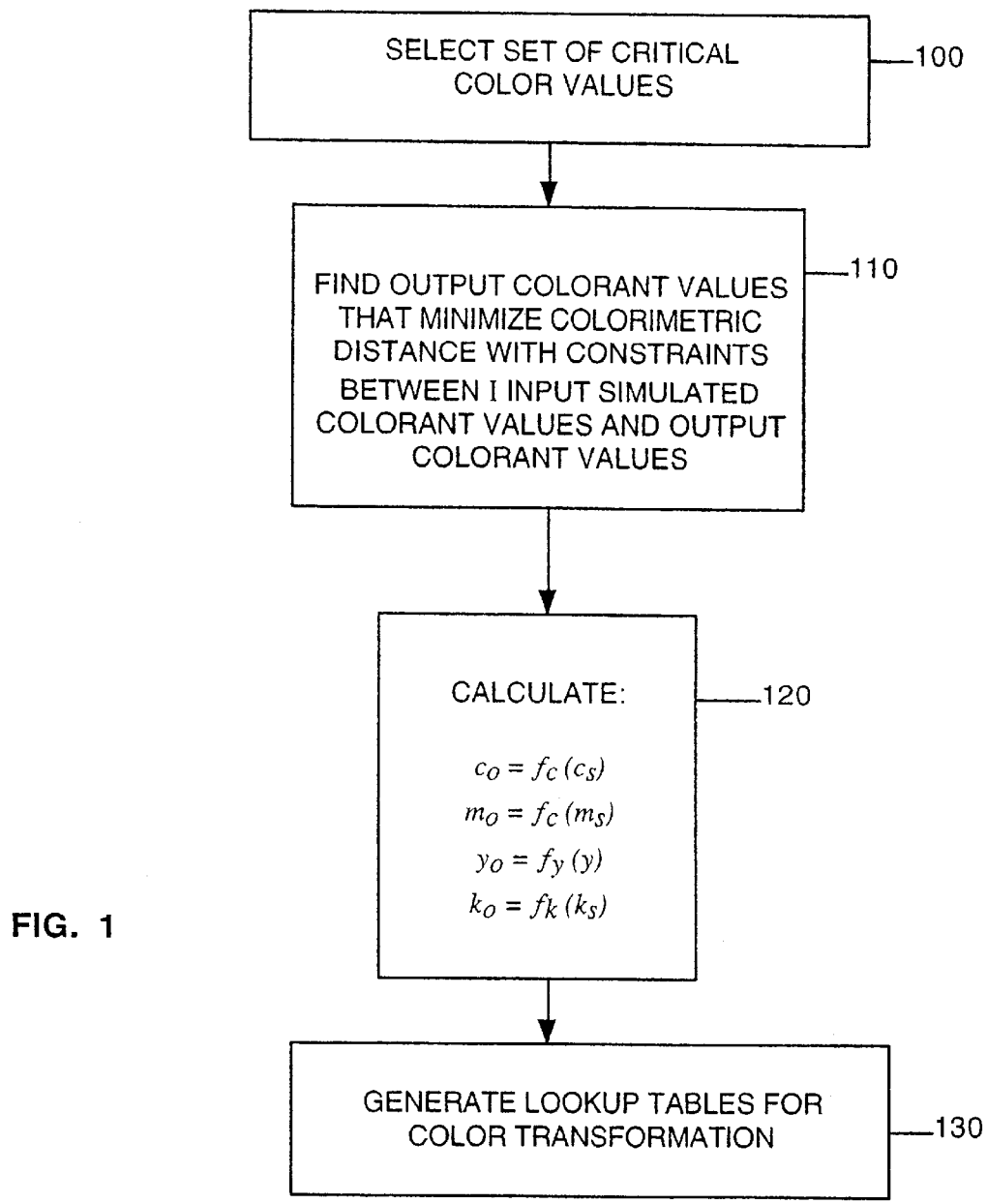
FIG. 1 is a flow diagram showing a technique for generating single-channel color transformations according to the invention.

FIG. 1 is a flow diagram showing a technique for generating single-channel color transformations according to the invention. The invention consists of first selecting a set of colorant values in the simulated device color space that are critical to render accurately (100). A requirement of the critical colors is that they lie on a set of curves in the simulated device colorant space. Define each curve in the set to be a smooth, parametric curve given by:

$$s_i(t) = (c_i(t), m_i(t), y_i(t), k_i(t)) \quad (12)$$

where the curve $s_i(t)$ is a vector function of parameter t with individual components $c_i$, $m_i$, $y_i$ and $k_i$, each a scalar function of parameter t in the range [0,1]. The set of curves, S, consists of N curves $s_i$ where the index i=1, ..., N.

A requirement of the set of curves is that, for each colorant of the simulated device, there is a curve in S that has the corresponding component function be a bijection (one-to-one, onto mapping) to [0,1].

An example that meets the conditions given above for S is the set of curves with the following properties:
1. Each curve is smooth and non-intersecting.
2. Each curve has at least one component that increases from no ink to full ink.
3. The set of all of the curves has the property that for each colorant $c_s$, $m_s$, $y_s$ and $k_s$ there is a curve where that component increases from one endpoint, with no ink, to the other endpoint, with full ink.

Recall that the invention applies to the class of single-channel color transformation given by $$c_o = f_c(c_s)$$
$$m_o = f_m(m_s)$$
$$y_o = f_y(y_s)$$
$$k_o = f_k(k_s) \quad (13)$$

Once the selection of the set of critical colors is made, the functions $f_c$, $f_m$, $f_y$, and $f_k$ of Equation 13 are calculated (120) by finding the output colorant values that minimize a colorimetric distance (i.e. CIELAB ΔE) between the input simulated colorant values and the output colorant values (110). This is done by using numerical minimization methods, where $$\Delta e = \sqrt{(L_1-L_2)^2+(a_1-a_2)^2+(b_1-b_2)^2}.$$

The search space is constrained to an appropriate set of output printer and simulated printer colorant values before this minimization takes places so that the appropriate functions may be generated. These constraints are built into the minimization process and differ depending on the goals of the user. The values generated by the transformation function are used to populate lookup tables (130) by which conversion from the simulated color space to the output color space is accomplished.

Figure 2:
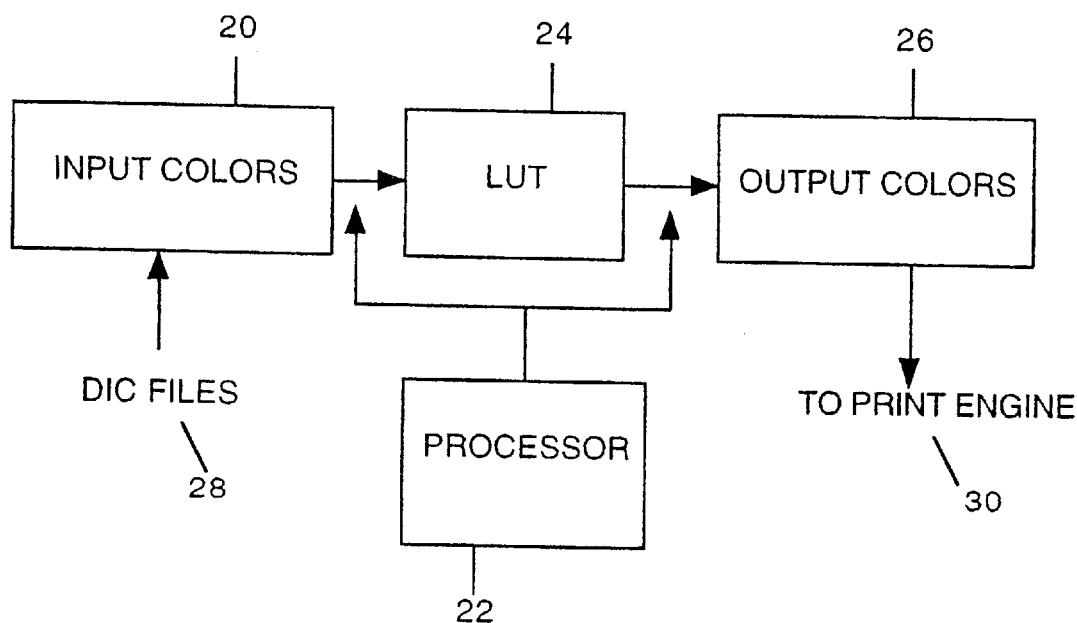
FIG. 2 is a block diagram of a system for generating single-channel color transformations according to the invention.

FIG. 2 is a block diagram of a system for generating single-channel color transformations according to the invention. In the example shown in FIG. 2, input file 28 provides an image separated to a simulated color space. Under control of a processor 22, the system applies the colorants in these files to lookup tables 24 which contain values for single-channel transforms, where the values were determined for critical colors in accordance with the invention as described herein. The transforms applied to the input colorant information result in files 26 having output colorants that most nearly match the output color to the input color for the critical colors. These files are sent to a print engine 30. In this way, the invention produces highly accurate results for certain critical colors, while perhaps sacrificing somewhat color accuracy for other colors.

EXAMPLE 1

Figure 3:
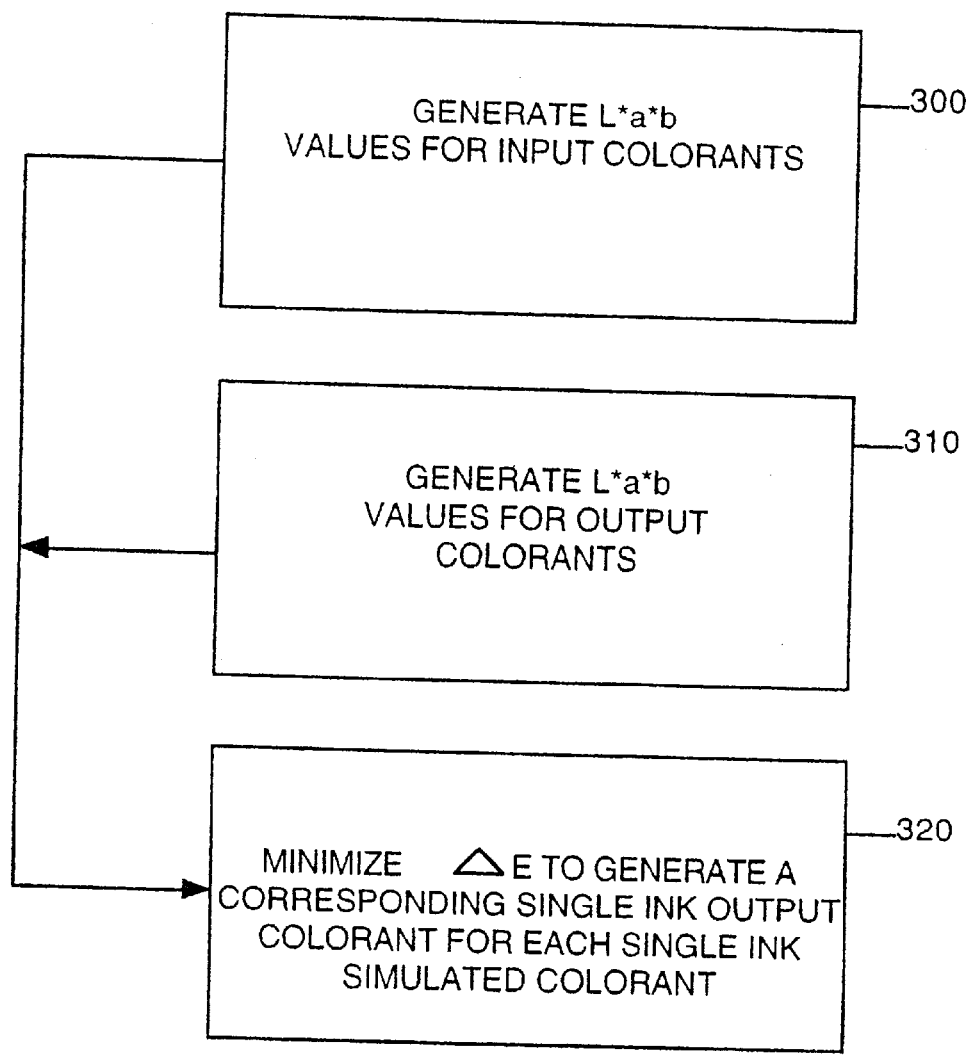
FIG. 3 is a flow diagram showing the technique for generating single-channel color transformations.

FIG. 3 is a flow diagram showing the technique for generating single-channel color transformations according to the invention. This technique subsumes the simple technique, used in the prior art, of optimizing each individual channel. For example, one may consider the set of critical colors to be given by the four curves $$(c_s, 0, 0, 0),$$
$$(0, m_s, 0, 0),$$
$$(0, 0, y_s, 0),$$

and $$(0, 0, 0, k_s),$$

where $c_s \in [0.0, 1.0]$ means the cyan colorant goes from no ink (0.0) to full ink (1.0).

The same conditions hold for $m_s$, $y_s$, and $k_s$.

This technique optimizes the transformation for single ink input colors. To create the simulation, L*a*b values are generated for the input colorants for the single ink curves (300). L*a*b values are also generated for the output colorants (310). ΔE is then minimized to generate the corresponding single ink output colorant for each single ink simulated colorant (320). This provides functions for each channel that minimize the errors for single ink input colors.

EXAMPLE 2

Figure 4:
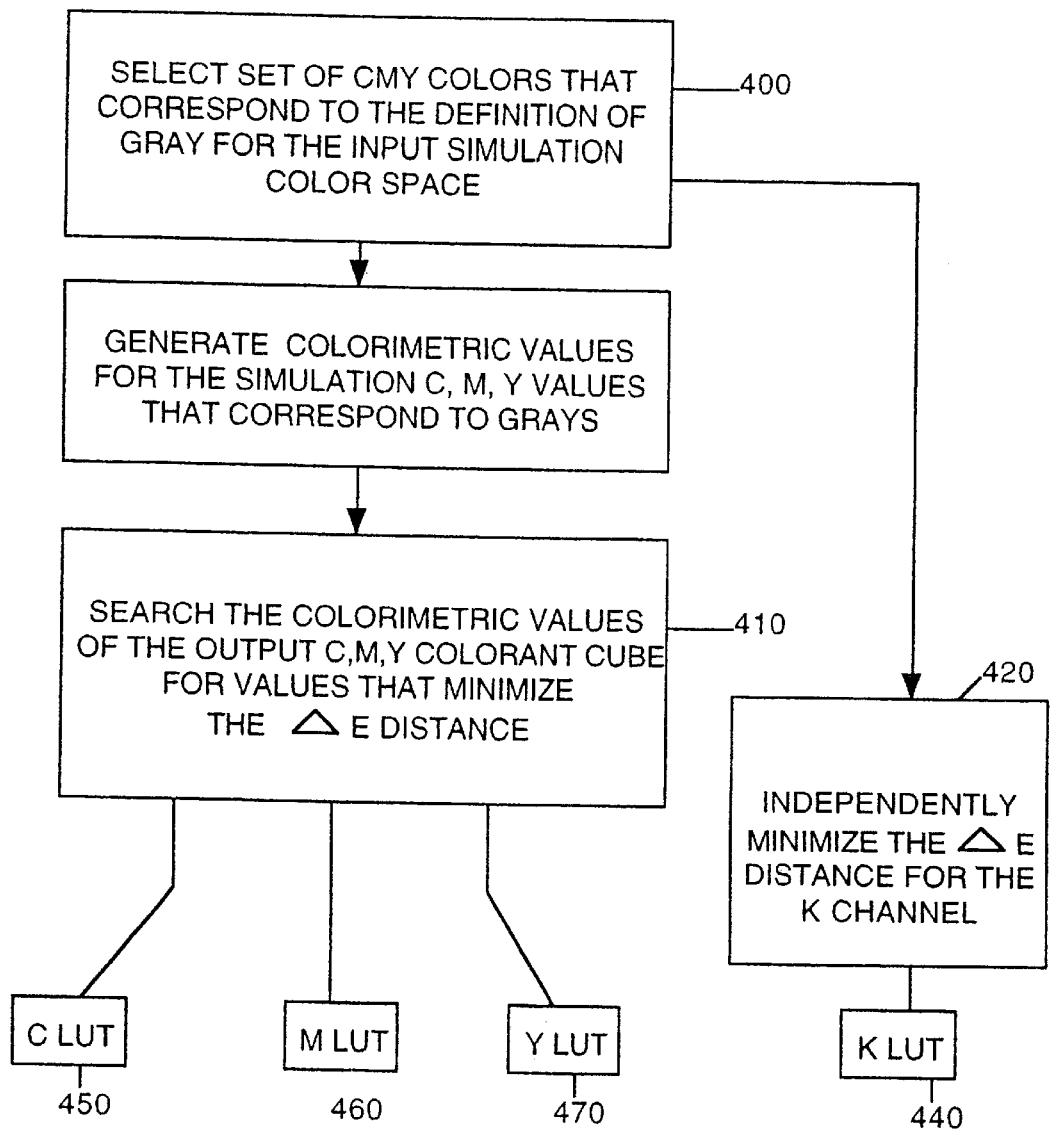
FIG. 4 is a flow diagram showing the generation of a single-channel color transformations, where gray colors are the critical colors, according to the invention.

FIG. 4 is a flow diagram showing the generation of a single-channel color transformation for the gray colors according to the invention. In this example, the generation of the single-channel color transformation improves the accuracy of gray colors. In this case, one selects a set of colors $(c_s, m_s, y_s, 0)$ that correspond to the definition of gray for the input simulation space (400). This can be done either by applying previous knowledge or by searching for those colors with CIELAB values given by (L, 0, 0). For these colors, one searches the output colorant space for values $(c_o, m_o, y_o, 0)$ that minimize the $\Delta E$ distance (410). The values of $c_o$, $m_o$, and $y_o$ define the functions $f_c$, $f_m$, and $f_y$ (per Equation 11) of the simulated colorants $c_s$, $m_s$, and $y_s$. The black channel is separately processed to determine the function $f_k$ for inputs $k_s$.

EXAMPLE 3

Figure 5:
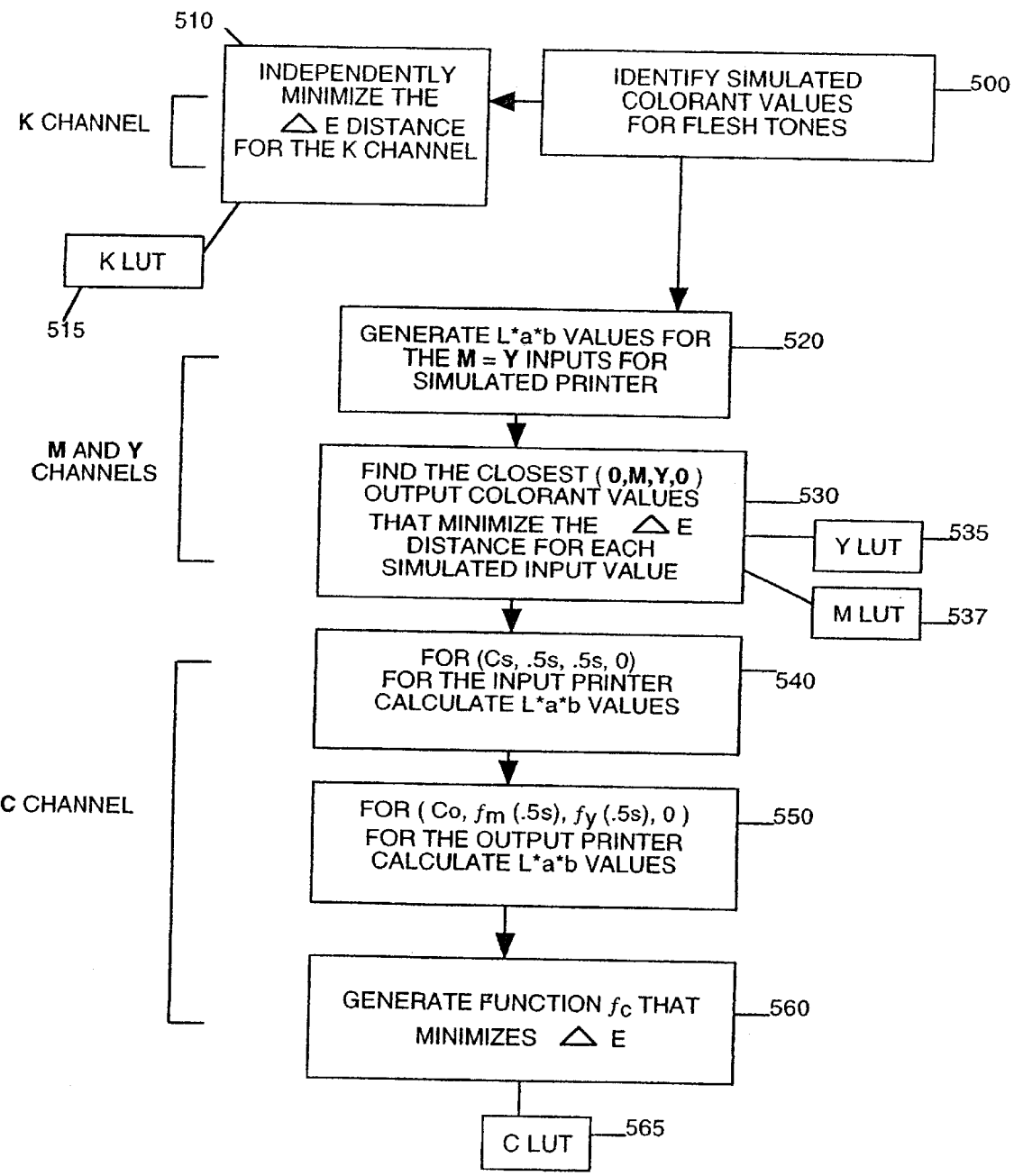
FIG. 5 is a flow diagram showing the generation of single-channel color transformations, where flesh tones are the critical colors, according to the invention.
Figure 6:
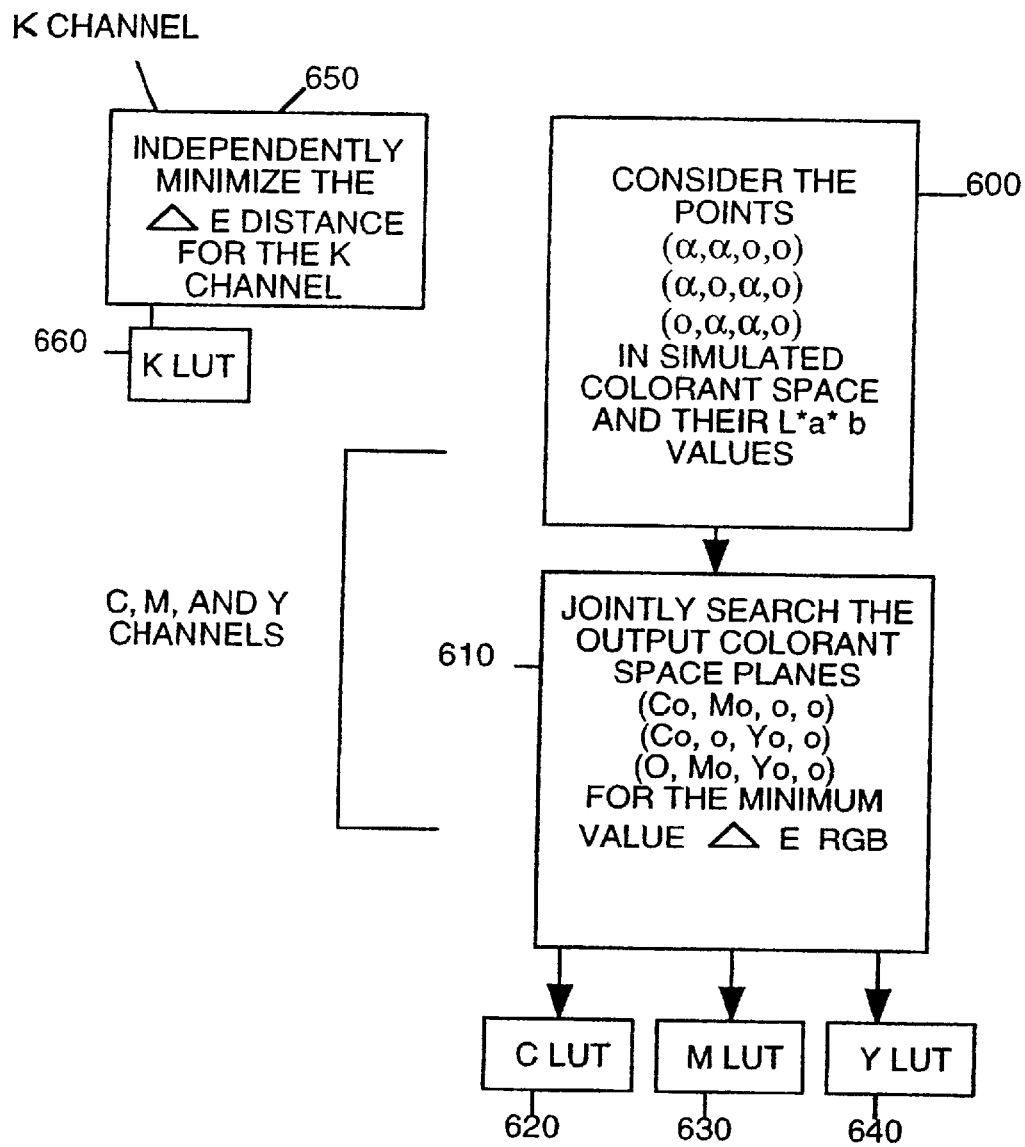
FIG. 6 is a flow diagram showing the use of joint optimization to find a single-channel transformation according to the invention.

FIG. 5 is a flow diagram showing the generation of single-channel color transformations for flesh tones according to the invention. In this example, the invention is used to simulate Japanese DIC press inks on an electrophotographic printer, where special attention is paid to the accuracy of the flesh tones.

To motivate the selection of the set of critical colors for this transformation, the values of $c_s$, $m_s$, $y_s$, and $k_s$ are considered for flesh tone regions of an image separated for DIC ink presses (500). It should be appreciated that this example is by no means limiting with regard to the scope of the invention. For example, another approach is to identify the CIELAB values that correspond to flesh tones and compute the corresponding DIC ink values for these CIELAB values. This latter approach has the advantage that the critical colors are defined in a device-independent color space and can thus be used for any simulated printer, not just one using DIC inks.

The following table shows the cyan, magenta, yellow and black values of several regions in an image, separated for DIC inks, that depict flesh tones, and where each row corresponds to a different region.

| Region | C | M | Y | K |
|--------|----|----|----|----|
| 1 | 0 | 36 | 45 | 0 |
| 2 | 0 | 33 | 42 | 0 |
| 3 | 10 | 47 | 53 | 0 |
| 4 | 24 | 50 | 60 | 0 |
| 5 | 20 | 49 | 55 | 0 |
| 6 | 0 | 24 | 33 | 0 |

From this data, the following simplifying assumptions are made:

DIC flesh tones consist of values without K,

DIC flesh tones consist of substantially equal M and Y values, and

DIC flesh tones may contain some cyan, especially where M and Y are about 0.5 (50% ink).

The following algorithm can be used to generate a single-channel color transformation that accurately renders flesh tones:

Fit the K channel by itself (510). For DIC press values (0, 0, 0, $k_s$) generate the CIELAB values. For the output device (0, 0, 0, $k_s$), generate the CIELAB values. Minimize the $\Delta E$ distance necessary for each input $k_s$ to generate the transformation $f_k$ for the K channel.

For the line (0, $m_s$, $y_s$, 0), where $m_s=y_s$, generate the L*a*b values (520). Generate the CIELAB values for the plane in the output colorant space that consists of (0, $m_o$, $y_o$, 0). (This plane of CIELAB data is used to explain the process: in practice the needed CIELAB values could also be found during the search process for the output values having the smallest $\Delta E$.) Find the closest (0, $m_o$, $y_o$, 0) CIELAB values for each of the input (0, $m_s$, $y_s$, 0) (530). This step simultaneously generates both the function $f_m$ for the M channel and the function $f_y$ for the Y channel.

For ($c_s$, $0.5_s$, $0.5_s$, 0) for the DIC input values, calculate the CIELAB values (540). For ($c_o$, $f_m(0.5_s)$, $f_y(0.5_s)$, 0), where $f_m$ and $f_y$ are the function found in the previous step for magenta and yellow, calculate the CIELAB values (550). Generate the function $f_c$, for the C channel, that minimizes $\Delta E$ (560).

The set of lookup tables described by $f_c$, $f_m$, $f_y$, and $f_k$ in practice generate very good simulations for DIC inks on many different kinds of electrophotographic printers.

EXAMPLE 4

The invention disclosed herein can also be used to find a single-channel transformation when the printer secondary colors: reds, greens, and blues are the critical colors. One feature of this example is the use of a joint optimization to find the single-channel transformation. In other words, the critical colors lying on separate curves jointly determine the optimal single-channel transformation. Thus, for a given triple of red, green, and blue simulated colorants, three corresponding output colorant planes, the $y_o=0$, $k_o=0$ plane, the $c_o=0$, $k_o=0$ plane, and the $m_o=0$, $k_o=0$ plane, are searched simultaneously to find the transfer curves for cyan, magenta, and yellow.

As in previous example, the black channel is fit independently.

To explain the method of fitting for the cyan, magenta and yellow channels, definitions are needed for the critical colors, the simulated device colors, and the output device colors, together with the definition of the metric $\Delta_{RGB}$ that is to be minimized.

First, the set of critical colors are on three curves, given by:

The "blue" curve, ($c_s$, $m_s$, 0, 0), where $c_s=m_s$.

The "red" curve, (0, $m_s$, $y_s$, 0), where $m_s=y_s$.

The "green" curve, ($c_s$, 0, $y_s$, 0), where $c_s=y_s$.

For each value $\epsilon$ [0,1], consider the three simulated device colors given by $b_s=($ , 0, 0), $r_s=(0,$ , , 0), and $g_s=($ , 0, , 0). Corresponding to these values are L*a*b values given by $t_s$ ($b_s$) for the blue color, $t_s$ ($r_s$) for the red color, and $t_s$ ($g_s$) for the green color (600).

Also consider the output colorant ($c_o$, $m_o$, $y_o$, 0). This point, projected onto three planes in the output colorant space, results in the point $cm_{o=(co}$, $m_o$, 0, 0), $my_o=(0, m_o, y_o$, 0), and $cy_o=(c_o, 0, y_o, 0)$. Corresponding to these points are the corresponding L*a*b values given by $t_o$ ($cm_o$) for the blue color, ($t_o$ $my_o$) for the red color, and $t_o$ ($cy_o$).

Component metrics are then defined that describe how well the output candidate colorant values approximate the input values for the blue, red, and green simulated colors, respectively. These metrics are given by $\Delta E_B = d(t_s(b_s), t_o(cm_o))$, $\Delta E_R = d(t_s(r_s), t_o(my_o))$, and $\Delta E_G = d(t_s(g_s), t_o(cy_o))$, where d represents Euclidean distance between the L*a*b values of the simulated device colorants and the L*a*b values of the corresponding output device colorants. If equal importance is given to reds, greens, and blues, then the metric $\Delta_{RGB} = \Delta E_R + \Delta E_D + \Delta E_B$.

Using a numerical optimization technique, a point ($c_o$, $m_o$, $y_o$, 0) is found that minimizes this quantity for a given $\mu$ (610). This process is repeated for all values of $\mu \in [0,1]$, or in practice for the 256 values required to build the tables. This results in the lookup tables for cyan (620), magenta (630), and yellow (640). The ΔE distance for the k channel is independently minimized (650) and values are provided for the k lookup table (660).

Other Embodiments

The invention is also readily used in conjunction with ICC profiles because these profiles contain the necessary colorimetric information. Thus, from the ICC profile for a simulated printer and the ICC profile of the output printer, a single-channel, critical color transformation may be generated by the methods described in this invention.

Further, the invention may be used to combine several critical sets and average the results to match a larger set of colors, or alternatively, the optimization step can be a joint optimization. The invention may also be used for CMY devices.

Although the invention is described herein with reference to the preferred embodiment, one skilled in the art will readily appreciate that other applications may be substituted for those set forth herein without departing from the spirit and scope of the present invention. Accordingly, the invention should only be limited by the Claims included below.

What is claimed is:

1. A method for generating single-channel color transformations, comprising the steps of:
   selecting a set of colorant values in a simulated device color space that are critical to render accurately;
   calculating the functions $f_c$, $f_m$, $f_y$, and $f_k$ by finding output colorant values that minimize a colorimetric distance between input simulated colorant values and output colorant values, where said functions $f_c$, $f_m$, $f_y$, and $f_k$ are single-channel color transformations given by $c_o = f_c(c_s)$
   $m_o = f_m(m_s)$
   $y_o = f_y(y_s)$
   $k_o = f_k(k_s)$;

and populating lookup tables with values determined as a result of said calculating step.

2. The method of claim 1, further comprising the step of:
   constraining a colorant value search space to a set of output device and simulated device colorant values before minimization takes places so that appropriate functions may be generated.

3. The method of claim 1, wherein said critical colors lie on a set of curves in space with the following properties:
   the critical colors lie on a set of curves in the simulated device colorant space;
   each curve in the set is a smooth, parametric curve given by:

$s_i(t) = (c_i(t), m_i(t), y_i(t), k_i(t))$ where the curve $s_i(t)$ is a vector function of parameter t with individual components $c_i$, $m_i$, $y_i$ and $k_i$, each a scalar function of parameter t in the range [0,1];
   wherein the set of curves, S, consists of N curves $s_i$ where the index $i = 1, \ldots, N$; and
   for each colorant of the simulated device, there is a curve in S that has a corresponding component function be a bijection (one-to-one, onto mapping) to [0,1].

4. The method of claim 1, wherein said single channel color transformations are calculated using an ICC profile for said simulated device and an ICC profile for an output device.

5. A method for generating single-channel color transformations for the gray colors, comprising the steps of:
   selecting a set of colors ($c_s$, $m_s$, $y_s$, 0) that correspond to a definition of gray for an input simulation space;
   searching an output colorant space for values ($c_o$, $m_o$, $y_o$, 0) that minimize a ΔE distance;
   wherein the values of $c_o$, $m_o$, and $y_o$ define functions $f_c$, $f_m$, and $f_y$ of simulated colorants $c_s$, $m_s$, and $y_s$; and
   populating lookup tables with values identified as a result of said searching step.

6. The method of claim 5, wherein a black channel is separately processed to determine a function $f_k$ for inputs $k_s$.

7. The method of claim 5, wherein said set of colors is selected by applying previous knowledge.

8. The method of claim 5, wherein said set of colors is selected by searching for those colors with CIELAB values given by (L, 0, 0).

9. An apparatus for generating single-channel color transformations for flesh tones, comprising:
   means for considering values of $c_s$, $m_s$, $y_s$, and $k_s$ for flesh tone regions of an image;
   means for generating a single-channel color transformation that accurately renders flesh tones; and
   means for populating a lookup table with values identified as a result of generating said transformation;
   wherein said generating means comprises:
      means for generating k channel CIELAB values for a simulated input device (0, 0, 0, $k_s$);
      means for generating k channel CIELAB values for an output device (0, 0, 0, $k_o$); and
      means for minimizing the distance necessary for each input $k_s$ to generate a transformation $f_k$ for the k channel.

10. A method for generating single-channel color transformations for flesh tones comprising the steps of:
    considering values of $c_s$, $m_s$, $y_s$, and $k_s$ for flesh tone regions of an image;
    generating a single-channel color transformation that accurately renders flesh tones;
    populating a lookup table with values identified as a result of generating said transformation;
    generating k channel CIELAB values for a simulated input device (0, 0, 0, $k_s$)
    generating k channel CIELAB values for an output device (0, 0, 0, $k_o$); and
    minimizing the distance necessary for each input $k_s$ to generate a transformation $f_k$ for the k channel.

11. A method for generating single-channel color transformations for flesh tones comprising the steps of:
    considering values of $c_s$, $m_s$, $y_s$, and $k_s$ for flesh tone regions of an image;
    generating a single-channel color transformation that accurately renders flesh tones;
    populating a lookup table with values identified as a result of generating said transformation;
    generating CIELAB values for (0, $m_s$, $y_s$, 0), where $m_s = y_s$;
    generating CIELAB values for a plane in an output colorant space that consists of (o, $m_o$, $y_o$, 0); and
    finding closest (0, $m_o$, $y_o$, 0) CIELAB values for each input (0, $m_s$, $y_s$, 0);
    wherein a function $f_m$ for $m_s$, and a function $f_y$ for $y_s$ is simultaneously generated.

12. A method for generating single-channel color transformations for flesh tones comprising the steps of:
   considering values of $c_s$, $m_s$, $y_s$, and $k_s$ for flesh tone regions of an image;
   generating a single-channel color transformation that accurately renders flesh tones;
   populating a lookup table with values identified as a result of generating said transformation;
   calculating CIELAB values for simulated device colorants ($c_s$, $0.5_s$, $0.5_s$, 0);
   calculating CIELAB values for output device colorants ($c_o$, $f_m(0.5_s)$, $f_y(0.5_s)$, 0), where $f_m$ and $f_y$ are functions for magenta and yellow; and
   generating a function $f_c$ that minimizes __E.

13. A method for generating single-channel color transformations for flesh tones comprising the steps of:
   considering values of $c_s$, $m_s$, $y_s$, and $k_s$ for flesh tone regions of an image;
   generating a single-channel color transformation that accurately renders flesh tones; and
   populating a lookup table with values identified as a result of generating said transformation;
   wherein Japanese DIC press inks are simulated on an electrophotographic printer.

14. A method for generating single-channel color transformations for flesh tones comprising the steps of:
   considering values of $c_s$, $m_s$, $y_s$, and $k_s$ for flesh tone regions of an image;
   generating a single-channel color transformation that accurately renders flesh tones; and
   populating a lookup table with values identified as a result of generating said transformation;
   wherein any of the following applies:
      flesh tones consist of values without black;
      flesh tones consist of substantially equal magenta and yellow values; and
      flesh tones may include cyan, especially where magenta and yellow are about 50% ink.

15. An apparatus for generating single-channel color transformations for flesh tones, comprising:
   means for considering values of $c_s$, $m_s$, $y_s$, and $k_s$ for flesh tone regions of an image;
   means for generating a single-channel color transformation that accurately renders flesh tones; and
   means for populating a lookup table with values identified as a result of generating said transformation;
   wherein Japanese DIG press inks are simulated on an electrophotographic printer.

16. An apparatus for generating single-channel color transformations for flesh tones, comprising:
   means for considering values of $c_s$, $m_s$, $y_s$, and $k_s$ for flesh tone regions of an image;
   means for generating a single-channel color transformation that accurately renders flesh tones; and
   means for populating a lookup table with values identified as a result of generating said transformation;
   wherein said generating means comprises:
      means for generating CIELAB values for (0, $m_s$, $y_s$, 0), where $m_s = y_s$
      means for generating CIELAB values for a plane in an output colorant space that consists of (o, $m_o$, $y_o$, 0);
      means for finding closest (0, $m_o$, $y_o$, 0) CIELAB values for each input (0, $m_s$, $y_s$, 0);
   wherein a function $f_m$ for $m_s$ and a function $f_y$ for $y_s$ is simultaneously generated.

17. An apparatus for generating single-channel color transformations for flesh tones, comprising:
   means for considering values of $c_s$, $m_s$, $y_s$, and $k_s$ for flesh tone regions of an image;
   means for generating a single-channel color transformation that accurately renders flesh tones; and
   means for populating a lookup table with values identified as a result of generating said transformation;
   wherein said generating means further comprises:
      means for calculating CIELAB values for input values for ($c_s$, $0.5_s$, $0.5_s$, 0);
      means for calculating CIELAB values for output device colorants ($c_o$, $f_m(0.5_s)$, $f_y(0.5_s)$, 0), where $f_m$ and $f_y$ are functions for magenta and yellow; and
      means for generating a function $f_c$ that minimizes __E.

18. An apparatus for generating single-channel color transformations, comprising:
   means for selecting a set of colorant values in the simulated device color space that are critical to render accurately;
   means for calculating the functions $f_c$, $f_m$, $f_y$, and $f_k$ by finding output colorant values that minimize a colorimetric distance between input simulated colorant values and output colorant values, where said functions $f_c$, $f_m$, $f_y$, and $f_k$ are single-channel color transformations given by $c_o = f_c(c_s)$ $m_o = f_m(m_s)$ $y_o = f_y(y_s)$ $k_o = f_k(k_s)$;

and means for populating lookup tables with values determined as a result of said calculating step.

19. The apparatus of claim 18, wherein a colorant value search space is constrained to a set of output device and simulated device colorant values before minimization takes places so that consistent functions may be generated.

20. The apparatus of claim 18, wherein said critical colors lie on a set of curves in space with the following properties:
   the critical colors lie on a set of curves in the simulated device colorant space;
   each curve in the set is a smooth, parametric curve given by:

$s_i(t) = (c_i(t), m_i(t), y_i(t), k_i(t))$ where the curve $s_i(t)$ is a vector function of parameter t with individual components $c_i$, $m_i$, $y_i$ and $k_i$, each a scalar function of parameter t in the range [0,1];
   wherein the set of curves, S, consists of N curves $s_i$ where the index i=1, . . . , N; and
   for each colorant of the simulated device, there is a curve in S that has a corresponding component function be a bijection (one-to-one, onto mapping) to [0,1].

21. The apparatus of claim 18, wherein said single channel color transformations are calculated using an ICC profile for said simulated device and for an output device.

22. An apparatus for generating single-channel color transformations for the gray colors, comprising:
   means for selecting a set of colors ($c_s$, $m_s$, $y_s$, 0) that correspond to a definition of gray for an input simulation space;

searching an output colorant space for values ($c_o$, $m_o$, $y_o$, 0) that minimize a ΔE distance;

wherein the values of $c_o$, $m_o$, and $y_o$ define functions $f_c$, $f_m$, and $f_y$ of simulated colorants $c_s$, $m_s$, and $y_s$; and populating at least one lookup table with values identified as a result of said searching step.

23. The apparatus of claim 22, wherein a black channel is separately processed to determine a function $f_k$ for inputs $k_s$.

24. The apparatus of claim 22, wherein said set of colors is selected by applying previous knowledge.

25. The apparatus of claim 22, wherein said set of colors is selected by searching for those colors with tristimulus values given by (L, 0, 0).

26. An apparatus for generating single-channel color transformations for flesh tones, comprising:

means for considering values of $c_s$, $m_s$, $y_s$, and $k_s$ for flesh tone regions of an image;

means for generating a single-channel color transformation that accurately renders flesh tones; and means for populating a lookup table with values identified as a result of generating said transformation;

wherein any of the following applies:
flesh tones consist of values without black;
flesh tones consist of substantially equal magenta and yellow values; and
flesh tones may include cyan colorants, especially where magenta and yellow are about 50% ink.

27. A method for generating single-channel color transformation, comprising the steps of:

selecting a set of colorant values in at least two planes of a simulated device color space that are critical to render accurately and their corresponding CIELAB values;

jointly searching a corresponding number of output colorant space planes for output colorset values that minimize a colorimetric distances between input simulated colorant CIELAB values and output colorant CIELAB values; and populating lookup tables with values determined as a result of said searching step;

wherein critical colors lying on separate curves jointly determine an optimal single-channel transformation.

28. An apparatus for generating single-channel color transformations, comprising:

means for selecting a set of colorant values in at least two planes of a simulated device color space that are critical to render accurately and their corresponding CIELAB values;

means for jointly searching a corresponding number of output colorant space planes for output colorant values that minimize a colorimetric distance between input simulated CIELAB values and output colorant CIELAB values; and at least two lookup tables that are populated with values determined by said searching means;

wherein critical colors lying on separate curves jointly determine an optimal single-channel transformation.

* * * * *

UNITED STATES PATENT AND TRADEMARK OFFICE
CERTIFICATE OF CORRECTION

PATENT NO. : 6,331,899 B1
DATED : December 18, 2001
INVENTOR(S) : Ramin Samadani It is certified that error appears in the above-identified patent and that said Letters Patent is hereby corrected as shown below:

Column 11,
Line 11, change "$(c_s, 0.5_s, 0.5_s, 0)$" to -- $(c_s, 0.5, 0.5, 0)$ --.
Line 13, change "$(c_o, f_m(0.5_s), f_y(0.5_s), 0)$" to -- $(c_o, f_m(0.5), f_y(0.5), 0)$ --.
Line 50, change "DIG" to -- DIC --.

Column 12,
Line 14, change "$(c_s, 0.5_s, 0.5_s, 0)$" to -- $(c_s, 0.5, 0.5, 0)$ --.
Line 16, change "$(c_o, f_m(0.5_s), f_y(0.5_s), 0)$" to -- $(c_o, f_m(0.5), f_y(0.5), 0)$ --.

Signed and Sealed this

First Day of April, 2003

JAMES E. ROGAN
*Director of the United States Patent and Trademark Office*